(12) United States Patent
Saenz

(10) Patent No.: US 7,624,960 B2
(45) Date of Patent: Dec. 1, 2009

(54) COMPRESSION RAIL FOR SLIDING CUP HOLDER TRAY

(75) Inventor: N. Antonio Saenz, Bellville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 250 days.

(21) Appl. No.: 11/348,395

(22) Filed: Feb. 6, 2006

(65) Prior Publication Data

US 2007/0181765 A1 Aug. 9, 2007

(51) Int. Cl.
*A47K 1/08* (2006.01)

(52) U.S. Cl. .................... 248/311.2; 224/281; 312/246; 312/319.1

(58) Field of Classification Search .............. 248/311.2; 224/281, 483; 312/246, 270.3, 319.1, 334.8, 312/350
See application file for complete search history.

(56) References Cited

U.S. PATENT DOCUMENTS

| 3,460,876 | A | * | 8/1969 | Boer | 312/246 |
| 3,610,718 | A | * | 10/1971 | Deboer | 312/246 |
| 4,660,881 | A | | 4/1987 | Komeya et al. | 296/37.9 |
| 4,953,771 | A | | 9/1990 | Fischer et al. | 224/273 |
| 5,004,306 | A | * | 4/1991 | Oshida | 312/319.1 |
| 5,395,084 | A | * | 3/1995 | Ikuma | 248/311.2 |
| 5,487,519 | A | * | 1/1996 | Grabowski | 248/311.2 |
| 5,749,554 | A | * | 5/1998 | Avila et al. | 248/311.2 |
| 5,988,579 | A | | 11/1999 | Moner, Jr. et al. | 248/311.2 |
| 6,250,527 | B1 | | 6/2001 | Mizue et al. | 224/281 |
| 6,450,468 | B1 | * | 9/2002 | Hamamoto | 248/311.2 |
| 6,547,299 | B2 | | 4/2003 | Atanasiu et al. | 296/24.1 |
| 6,575,542 | B2 | | 6/2003 | Shimajiri | 312/332 |
| 6,702,241 | B2 | * | 3/2004 | Harada | 248/311.2 |
| 2002/0171018 | A1 | | 11/2002 | Harada | 248/311.2 |
| 2006/0060741 | A1 | * | 3/2006 | Yanagita et al. | 248/311.2 |

* cited by examiner

*Primary Examiner*—J. Allen Shriver, II
*Assistant Examiner*—Bradley H Duckworth
(74) *Attorney, Agent, or Firm*—Gifford, Krass, Sprinkle, Anderson & Citkowski, P.C.

(57) ABSTRACT

According to one aspect of the invention, a cup holder assembly includes a support frame, a cup holder and a dampener. The support frame has spaced apart walls. The cup holder is slidably engaged with the walls of the support frame for movement between a stowed position disposed between the walls of the support frame and a use position extending outwardly from the support frame. The dampener is coupled to the walls of the support frame. The dampener has an arcuate spring member formed integrally therewith to provide an interference fit with the cup holder for dampening the sliding movement of the cup holder relative to the sleeve between the stowed and use positions.

6 Claims, 4 Drawing Sheets

# COMPRESSION RAIL FOR SLIDING CUP HOLDER TRAY

BACKGROUND OF THE INVENTION

1. Field of the Invention

The invention relates to retractable cup holders in automotive vehicles. More particularly, the invention relates to a rail for dampening the movement of a retractable cup holder between stowed and use positions.

2. Description of the Related Art

Automotive vehicles typically include cup holders for holding beverage containers within the vehicle passenger compartment. Typically, the cup holder is integral with a center console, armrest or dashboard. Some vehicles include a cup holder that is slidable between a stowed position and a use position. In the stowed portion, the cup holder is disposed within a cavity hidden behind a wall of a console, armrest or dashboard. In the use position, the cup holder extends outwardly from the wall for supporting a beverage container.

The sliding mechanisms that allow the movement of the cup holder between the stowed and use positions range in complexity. Simple mechanisms allow fully manual movement of the cup holder. More complex mechanisms are spring loaded for one-touch actuation of the cup holder between the stowed and use positions. These one-touch designs also typically include structures for dampening the motion of the cup holder. Conventional dampening, such as compression rails, structures utilize spring metal members that apply force along a side face of the cup holder, thereby creating a frictional force that slows or dampens the motion of the cup holder between the stowed and use positions. It is readily appreciated that these complex sliding mechanisms are more expensive than the simple manually operated mechanisms. It remains desirable to provide an improved cup holder design that is less expensive to produce and assemble than conventional designs, without sacrificing function and quality.

SUMMARY OF THE INVENTION

According to one aspect of the invention, a cup holder assembly includes a support frame, a cup holder and a dampener. The support frame has spaced apart walls.

The cup holder is slidably engaged with the walls of the support frame for movement between a stowed position disposed between the walls of the support frame and a use position extending outwardly from the support frame. The dampener is coupled to the walls of the support frame. The dampener has an arcuate spring member formed integrally therewith to provide an interference fit with the cup holder for dampening the sliding movement of the cup holder relative to the sleeve between the stowed and use positions.

According to another aspect of the invention, a dampener is provided for dampening the motion of a sliding accessory relative to a support frame. The dampener includes a longitudinally extending wall having opposite outer and inner surfaces. The inner surface is adapted to be fixedly secured to one of the sliding accessory or the support frame. An arcuately shaped spring member is formed integrally with the longitudinally extending wall of the dampener. The spring member extends outwardly from the one of the sliding accessory or the rigid frame member for providing an interference fit between the sliding accessory and the support frame.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

The invention provides a cup holder assembly having an improved compression rail or dampener for dampening the motion of the cup holder between a stowed position and a use position. The dampener is made entirely of plastic, thereby eliminating the need for metal springs as used in conventional designs. The cup holder assembly with the improved dampener design is described in greater detail below.

Figure 1:
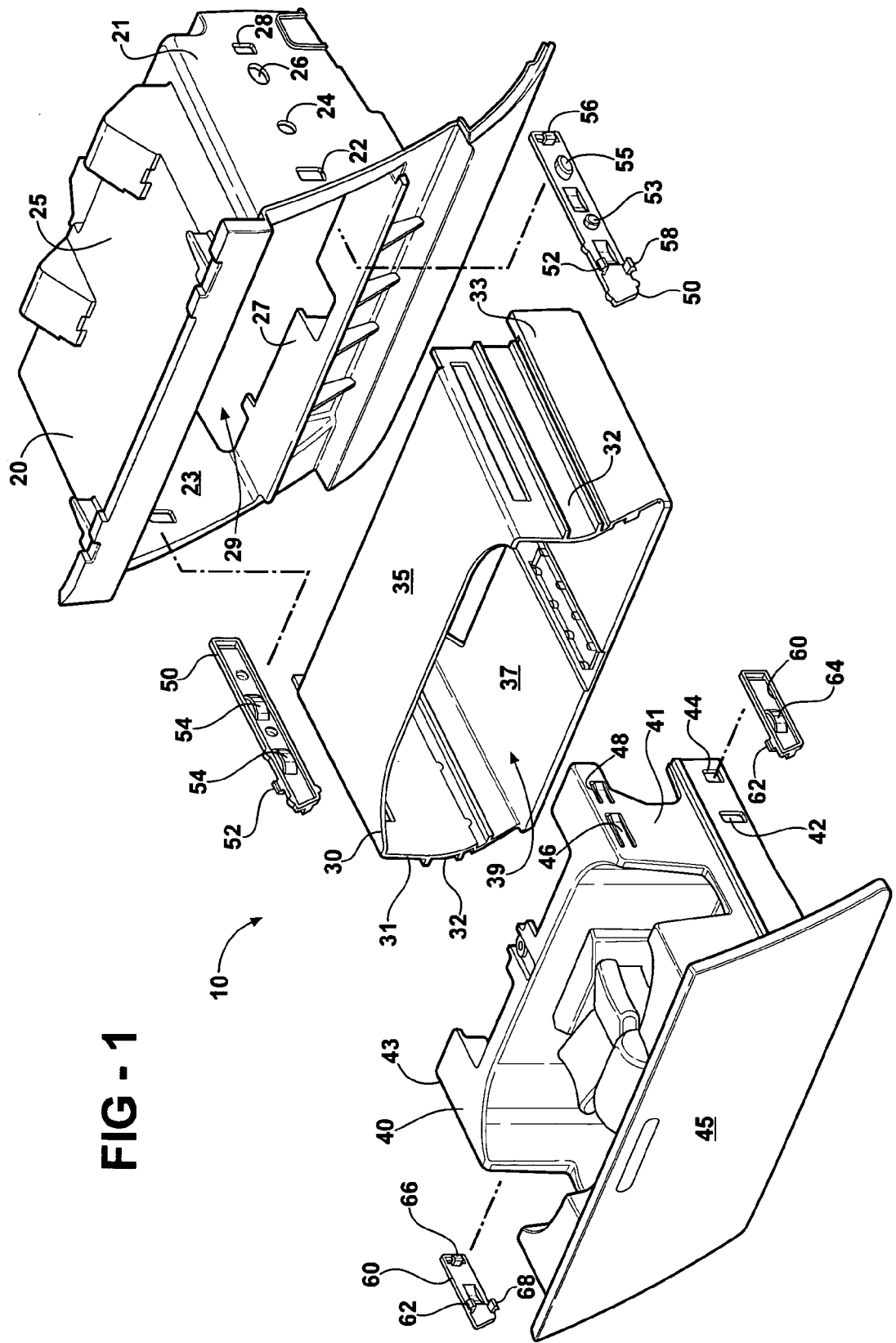
FIG. 1 is an exploded perspective view of a cup holder assembly according to one embodiment of the invention.

Referring to FIG. 1, a cup holder assembly according to the invention is generally indicated at 10. The cup holder assembly 10 includes a support frame 20, a sleeve 30 and a cup holder 40. The support frame 20 is adapted to be fixedly secured to a wall of a dashboard (not shown). The support frame 20 includes generally parallel and spaced apart side walls 21, 23. The frame 20 also includes generally parallel and spaced apart top 25 and bottom 27 walls. The walls 21, 23, 25, 27 of the frame 20 are arranged to form a first rectangular opening 29 to slidably receive the sleeve 30 therethrough. Similarly, the sleeve 30 includes generally parallel and spaced apart side walls 31, 33. The sleeve 30 also includes generally parallel and spaced apart top 35 and bottom 37 walls. The walls 31, 33, 35, 37 of the sleeve 30 are arranged to form a second rectangular opening 39 to slidably receive the cup holder 40 therethrough.

Figure 4:
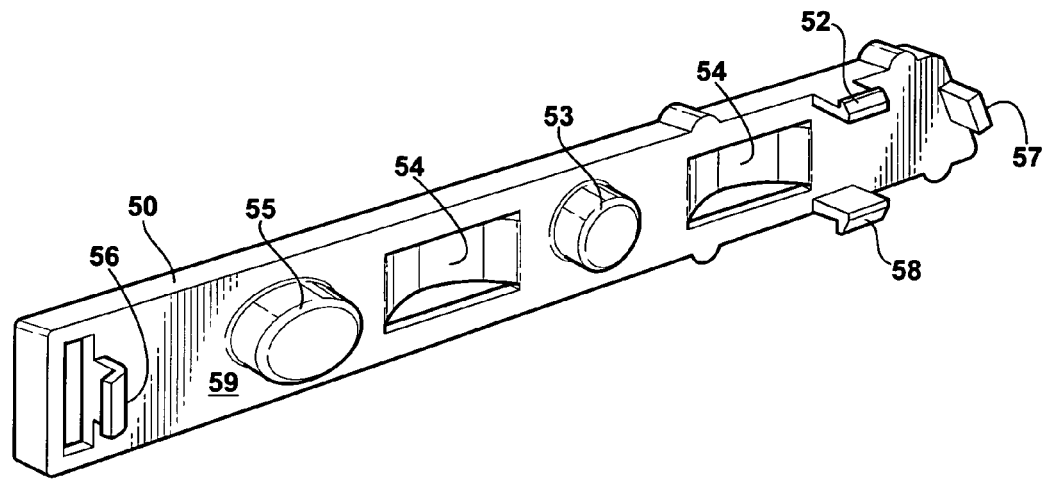
FIG. 4 is a front perspective view of a dampener in the cup holder assembly of FIG. 1.
Figure 5:
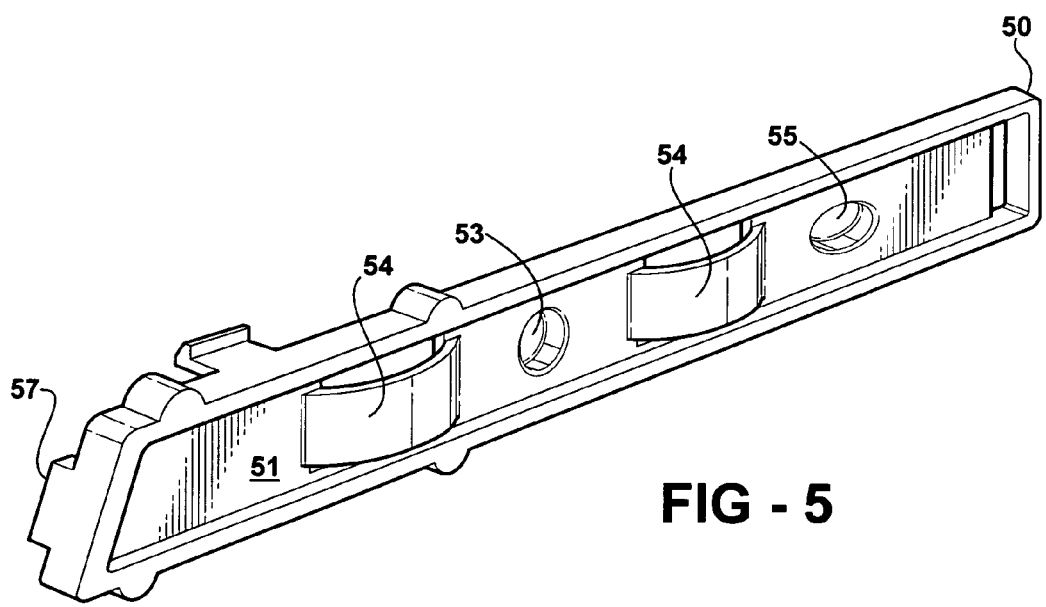
FIG. 5 is a rear perspective view of the dampener of FIG. 4.

The cup holder assembly 10 includes a first compression rail or dampener 50 for dampening the sliding movement of the sleeve 30 relative to the frame 20. As shown in FIGS. 4 and 5, the first dampener 50 includes opposite inner 51 and outer 59 surfaces. A pair of bosses 53, 55 extends outwardly from the outer surface 59 of the dampener 50 for locating the first dampener 50 during assembly with the side wall 21. One boss 53 has a circular shaped profile and extends through a circular hole 24 formed in the side wall 21. The other boss 55 has an ovular shaped profile and extends through an ovular shaped hole 26 formed in the side wall 21. This arrangement allows only one orientation of the first dampener relative to the side wall 21.

The first dampener 50 also includes an end hook 56 that extends from the outer surface 59 and through a rear slot 28 in the side wall 21. The first dampener 50 also includes a plurality of tabs 52, 58 that extends from the outer surface 59 to hookingly engage respective sides of a rectangular front slot 22 formed in the side wall 21. Thus, during assembly, the end hook 56 is first inserted through the rear slot 28. The bosses 53, 55 ensure that the first dampener 50 is properly oriented relative to the side wall 21. The tabs 52, 58 are then pushed through the front slot 22, so as to hookingly engage respective sides of the front slot 22.

Figure 2:
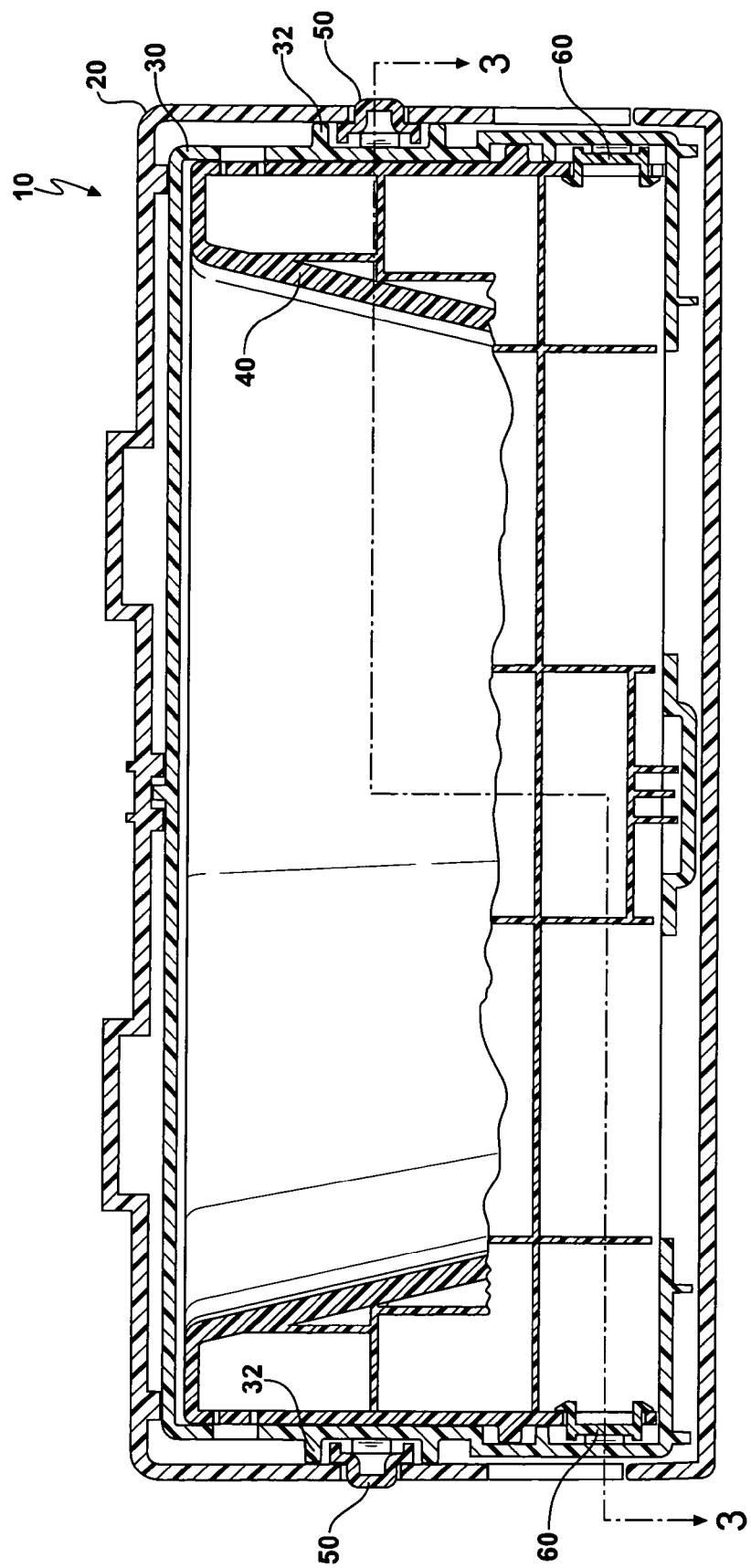
FIG. 2 is a front cross sectional view of the assembly in FIG. 1.
Figure 3:
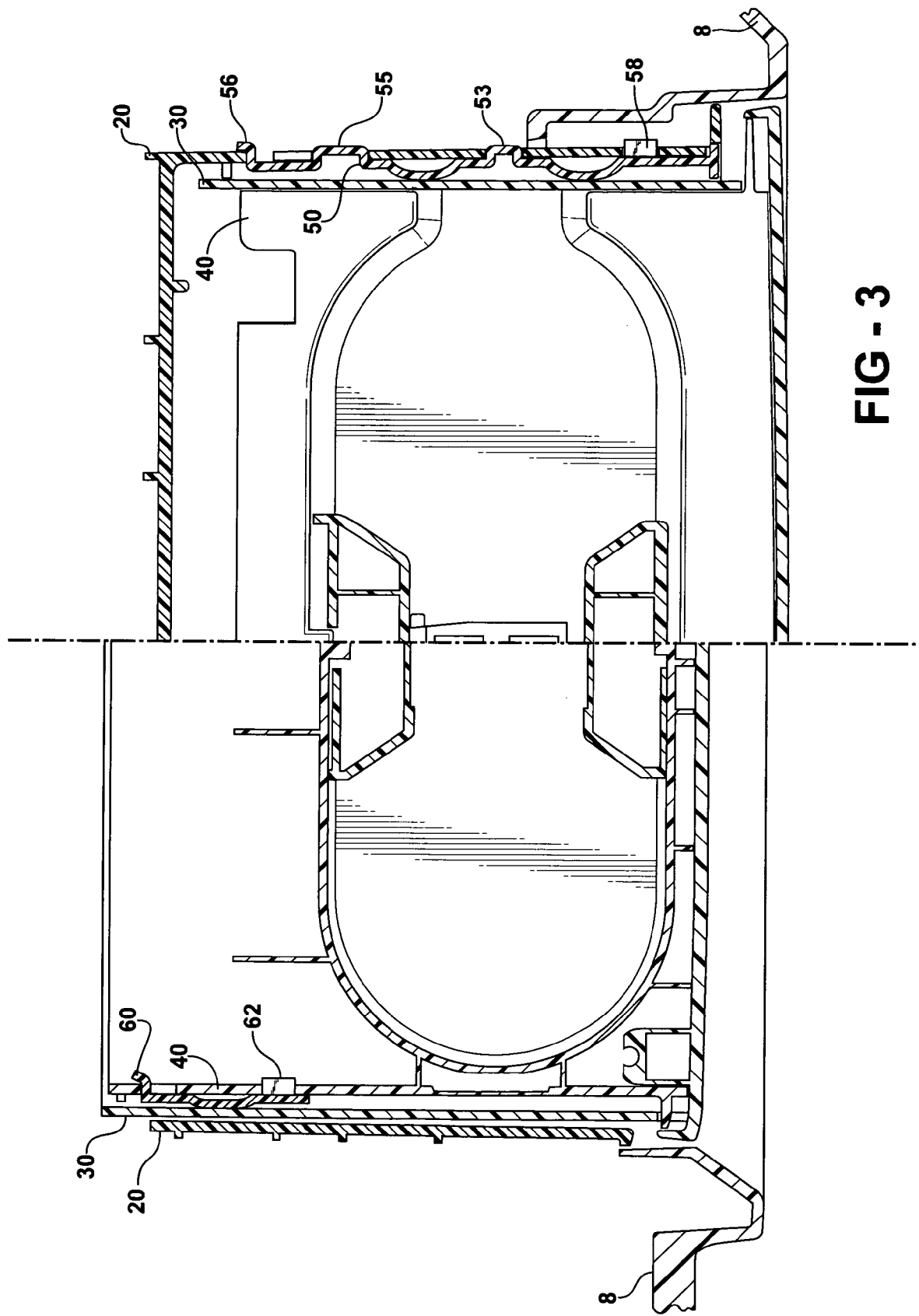
FIG. 3 is a side cross sectional view taken through 3-3 indicated in FIG. 2.

Referring to FIGS. 2 and 3, a pair of first dampeners 50 are coupled to the side walls 21, 23 of the frame 20 and protrude inwardly toward each other to act on opposite side walls 31, 33 of the sleeve 30. The first dampeners 50 are slidably engaged within longitudinally extending tracks 32 formed in the side walls 31, 33 of the sleeve 30. The first dampener 50 also includes at least one arcuately shaped spring member 54 that extends outwardly relative to the inner surface 51 and interference fitting within a corresponding track 32. In one embodiment of Pie invention, the first dampener 50 includes a pair of spring members 54. The spring members 54 protrude into the opening 29 to define an interference fit within each of the tracks 32 of the sleeve 30. The interference between the spring members 54 and the tracks 32 dampens the sliding movement of the sleeve 30 relative to the frame 20. The spring members 54 are made of plastic and are integrally formed as a single unit with the first dampener 50 dining a plastic injection molding process.

The cup holder assembly 10 also includes a second dampener 60 for dampening the sliding movement of the cup holder 40 relative to the sleeve 30. A pair of second dampeners 60 is fixedly secured to respective opposite side walls 41, 43 of the cup holder 40. An end hook 66 extends through a rear slot 44 in the side wall 41, 43. Hooked tabs 62 engage respective sides of a front slot 42. The end hook 66 and the tabs 62 couple the second dampeners 60 to the side walls 41, 43. Each second dampener 60 includes an arcuately shaped spring member 64. The spring members 64 extend outwardly from opposite sides 41, 43 of the cup holder 40 to interfere with and slidably engage respective interior side walls 31, 33 of the sleeve 30 for dampening sliding movement of the cup holder 40 relative to the sleeve 30.

A spring-loaded one-touch mechanism (not shown) allows a user to push on the front face 45 of the cup holder 40 to cause movement of the cup holder 40 to either the stowed and use positions. The first dampeners 50 exert a lateral force on the outer surface of the side walls 31, 33 of the sleeve 30 to dampen the sliding motion of the sleeve between the stowed and use positions. Similarly, the second dampeners 60 exert a lateral force on the inner surface of the side walls 31, 33 of the sleeve 30 to dampen the sliding motion of the cup holder 40 relative to the sleeve 30. The lateral forces applied by the dampeners 50, 60 also provide rigidity to the overall assembly 10 during movement of the cup holder 40 between the stowed and use positions. The dampened motion combined with the rigidity in the assembly 10 renders a sense of enhanced quality associated with the operation of the cup holder 40. Preferably, the dampeners 50, 60 are vertically spaced apart to exert a lateral force on substantially opposite upper and lower ends of the side walls 31, 33 of the sleeve 30.

The dampeners 50, 60 as described above are formed from plastic. In one embodiment of the invention, the dampeners 50, 60 are formed in an injection molding process, so that the spring members 54, 64 are integrally formed as part of the dampeners 50, 60. The dampeners 50, 60 improve over conventional designs by eliminating the need to produce and assemble separate spring metal parts to the dampener. Thus, the dampeners 50, 60 according to the invention provide significant cost savings due to reduced part count and assembly costs without sacrificing function and quality.

It should be readily appreciated by those having ordinary skill in the art that the dampeners 50, 60 may also be used to dampen the motion of other sliding accessories in the vehicle, such as lids, doors, ashtrays and manually operated push and pull cup holder designs.

The invention has been described in an illustrative manner. It is, therefore, to be understood that the terminology used is intended to be in the nature of words of description rather than of limitation. Many modifications and variations of the invention are possible in light of the above teachings. For example, the dampeners can be fixedly secured to the sleeve to act on the side walls of the frame and cup holder. Alternatively, the dampeners can be arranged to act on the top and bottom walls of the sleeve rather than the side walls. Alternatively, the cup holder may be directly slidably engaged with the frame, wherein the dampeners act between the side walls of the cup holder and the frame rather than the sleeve. It should, therefore, be readily appreciated that the invention may be practiced other than as specifically described, while remaining within the scope of the appended claims.

The invention claimed is:

1. A cup holder assembly, comprising:
a fixed outer support frame defining an opening;
an intermediate sleeve having side extending tracks, said sleeve dimensioned to be seated within said opening and slidable relative to said support frame, said sleeve defining a second opening;
a first pair of dampeners mounted to opposing side walls of said support frame and in seating fashion within said tracks of said sleeve, each of said first pair of dampeners including a first arcuately shaped member interference fitting within said track for dampening the sliding movement of said sleeve relative to said frame;
an inner cup holder dimensioned to be seated within said second opening and slidable relative to said intermediate sleeve; and
a second pair of dampeners mounted between opposing side walls established between said intermediate sleeve and said inner cup holder, each of said second pair of dampeners including a second arcuately shaped member interference fitting against interior side walls of said sleeve for dampening sliding movement of said cup holder relative to said sleeve;
said first and second pairs of dampeners vertically spaced relative to each other, said arcuately shaped members of said first pair of said dampeners extending outwardly toward and opposing said arcuately shaped members of said second pair of dampeners so that each pair of dampeners exerts an opposing lateral force relative to the other pair of dampeners and along said side walls of said sleeve in order to provide rigidity to said assembly during movement of said cup holder, said dampeners further exhibiting spring biasing properties for cooperatively facilitating smooth displacement of said inner cup holder relative to said support frame between stowed and use positions.

2. The assembly as described in claim 1, each of said first pair of dampeners further comprising an elongate configuration with at least one projecting tab for mounting to an inner face associated with each of said outer frame side walls.

3. The assembly as described in claim 2, each of said first pair of dampeners further comprising a boss extending from a first surface of said dampener and seating through a mating opening defined within said outer frame side wall concurrent with said projecting tab engaging additional slot defined locations within said side wall.

4. The assembly as described in claim 3, said boss further comprising a plurality of first and second bosses, said first boss exhibiting a circular profile and said second boss an ovular profile, said bosses seating within corresponding circular and oval holes formed in said outer frame side wall and to facilitate orienting each of said first pair of dampeners during assembly.

5. The assembly as described in claim 1, each of said second pair of dampeners further comprising an elongate configuration with at least one projecting tab for mounting to an exterior face associated with each of said cup holder side walls.

6. The assembly as described in claim 1, each of said first and second pairs of dampeners exhibiting a specified shape and size and further comprising a plasticized construction.

* * * * *

UNITED STATES PATENT AND TRADEMARK OFFICE
CERTIFICATE OF CORRECTION

PATENT NO. : 7,624,960 B2  Page 1 of 1
APPLICATION NO. : 11/348395
DATED : December 1, 2009
INVENTOR(S) : N. Antonio Saenz It is certified that error appears in the above-identified patent and that said Letters Patent is hereby corrected as shown below:

Column 2, line 67 replace "die" with --the--

Column 3, line 4 replace "Pie" with --the--

Column 3, line 11 replace "dining" with --during--

Signed and Sealed this

Twenty-third Day of February, 2010

David J. Kappos
*Director of the United States Patent and Trademark Office*